United States Patent
Boguslavskij et al.

(10) Patent No.: US 8,189,832 B2
(45) Date of Patent: May 29, 2012

(54) TRANSMISSION METHOD WITH DYNAMIC TRANSMISSION POWER ADJUSTMENT AND CORRESPONDING HEARING DEVICE SYSTEM

(75) Inventors: Mihail Boguslavskij, Coburg (DE); Jürgen Reithinger, Neunkirchen am Brand (DE); Ulrich Schätzle, Forchheim (DE)

(73) Assignee: Siemens Audiologische Technik GmbH, Elangen (DE)

( * ) Notice: Subject to any disclaimer, the term of this patent is extended or adjusted under 35 U.S.C. 154(b) by 1114 days.

(21) Appl. No.: 12/075,441

(22) Filed: Mar. 11, 2008

(65) Prior Publication Data

US 2008/0226107 A1    Sep. 18, 2008

(30) Foreign Application Priority Data

Mar. 12, 2007  (DE) .................. 10 2007 011 841

(51) Int. Cl.
H04R 25/00   (2006.01)
(52) U.S. Cl. ............... 381/312; 381/315; 455/522
(58) Field of Classification Search .......... 381/315, 381/312, 314, 316, 317, 320; 445/575.2, 445/41.1, 522
See application file for complete search history.

(56) References Cited

U.S. PATENT DOCUMENTS

| | | | |
|---|---|---|---|
| 5,042,084 A * | 8/1991 | Daly | 455/41.1 |
| 6,839,447 B2 * | 1/2005 | Nielsen et al. | 381/312 |
| 7,215,974 B2 * | 5/2007 | Haim | 455/522 |
| 7,277,553 B2 | 10/2007 | Reithinger | |
| 7,818,036 B2 * | 10/2010 | Lair et al. | 455/575.2 |
| 2004/0209635 A1 | 10/2004 | Hsu et al. | |
| 2005/0036638 A1 | 2/2005 | Reithinger | |
| 2005/0238190 A1 * | 10/2005 | Rohrlein | 381/312 |
| 2006/0177081 A1 * | 8/2006 | Bauml et al. | 381/315 |

FOREIGN PATENT DOCUMENTS

| | | |
|---|---|---|
| DE | 4322853 A1 | 1/1995 |
| DE | 10323219 B3 | 12/2004 |
| DE | 102005005603 A1 | 8/2006 |
| EP | 0685129 B1 | 12/1995 |
| EP | 1187362 B1 | 3/2002 |
| WO | 00/69091 A1 | 11/2000 |

OTHER PUBLICATIONS

Prof. Dr.-Ing. Jörg Eberspächer, Dipl.Ing. Hans-Jörg Vögel; GSM Global System for Mobile Communication. Vermittlung, Dienste and Protokolle in digitalen Mobilfunknetzen, Stuttgart: Teubner, 1997, pp. 100-111. ISBN 3-519-06192-9.

* cited by examiner

Primary Examiner — Davetta W Goins
Assistant Examiner — Phan Le

(57) ABSTRACT

With the date transmission in a hearing device system, overloads are to be avoided and the energy consumption during transmission is to be kept as low as possible. To this end, a transmission method and a corresponding system for the inductive transmission is proposed, in which the receiver returns an item of quality information relating to the received signal back to the transmitter. The transmission power of the transmitter is then dynamically varied as a function of the item of quality information. With unidirectional transmission, the transmitter can obtain an item of distance information relating to the distance of the receiver from the transmitter and thereupon adjust the transmission power accordingly.

8 Claims, 2 Drawing Sheets

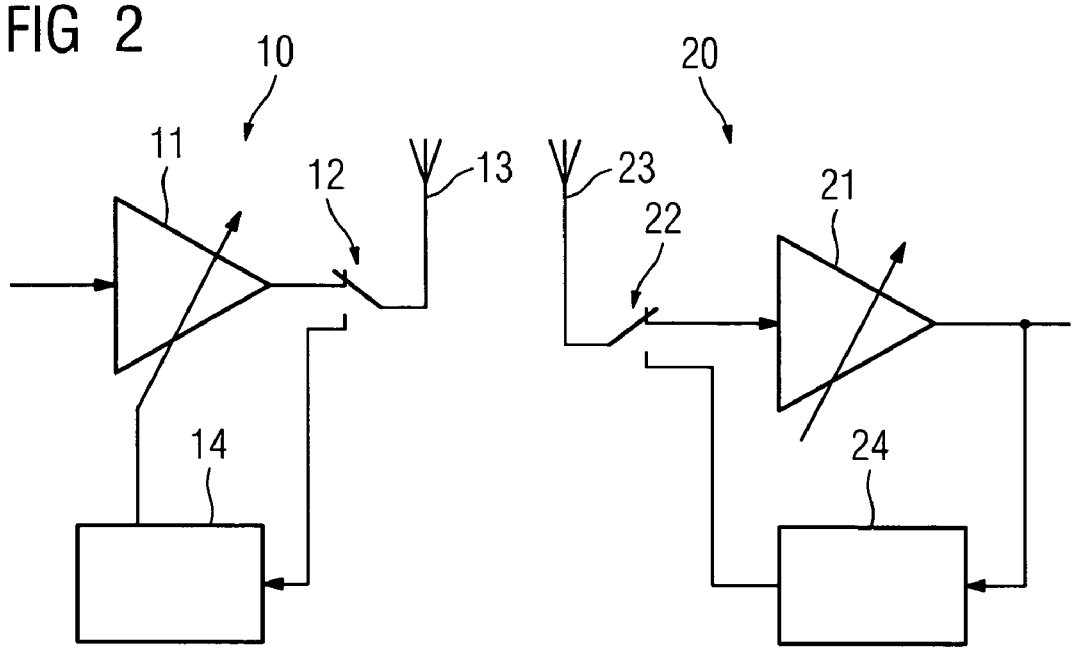
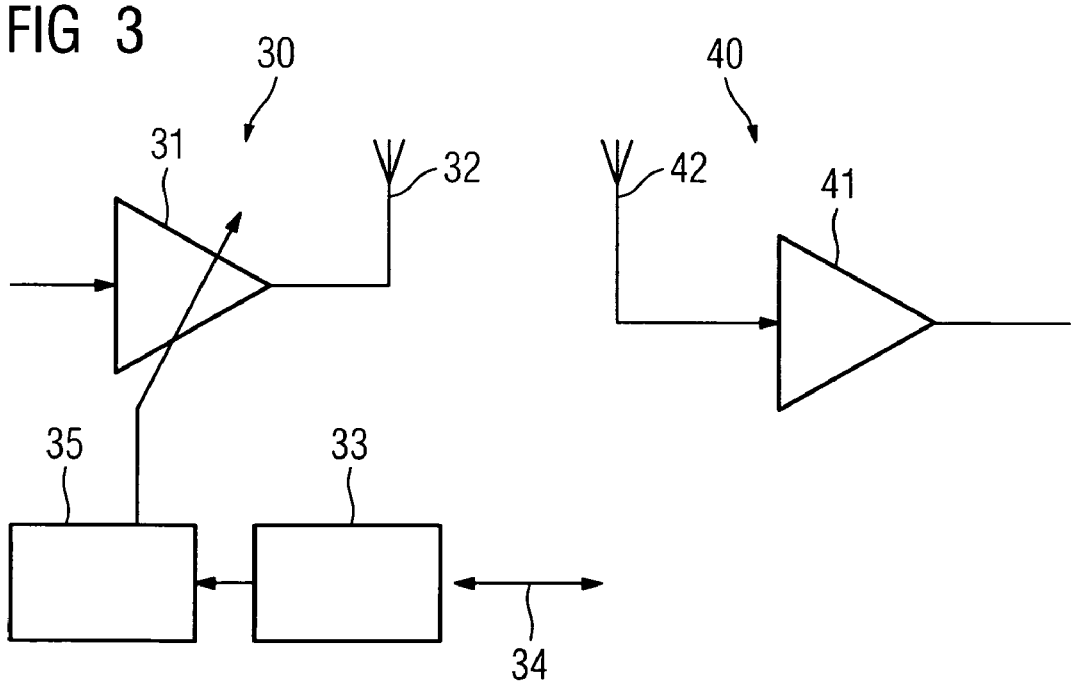

TRANSMISSION METHOD WITH DYNAMIC TRANSMISSION POWER ADJUSTMENT AND CORRESPONDING HEARING DEVICE SYSTEM

CROSS REFERENCE TO RELATED APPLICATIONS

This application claims priority of German application No. 10 2007 011 841.6 DE filed Mar. 12, 2007, which is incorporated by reference herein in its entirety.

FIELD OF INVENTION

The present invention relates to a transmission method for the inductive transmission in hearing devices and hearing device accessories by transmitting a signal from a transmitter to a receiver with a specific transmission power. The present invention also relates to a corresponding hearing device system.

BACKGROUND OF INVENTION

Hearing devices are portable hearing apparatuses which are used to supply the hard-of-hearing. To accommodate the numerous individual requirements, different configurations of hearing devices such as behind-the-ear hearing devices (BTE), in-the-ear hearing devices (ITE), e.g. including conch hearing devices or channel hearing devices (CIC), are provided. The hearing devices given here as examples are worn on the outer ear or in the auditory canal. Furthermore, bone conduction hearing aids, implantable or vibrotactile hearing aids are also available on the market. The damaged hearing is stimulated either mechanically or electrically in such devices.

Essential components of the hearing devices include in principal an input converter, an amplifier and an output converter. The input converter is generally a receiving transducer, e.g. a microphone and/or an electromagnetic receiver, e.g. an induction coil. The output converter is mostly realized as an electroacoustic converter, e.g. a miniature loudspeaker, or as an electromechanical converter, e.g. a bone conduction receiver. The amplifier is usually integrated into a signal processing unit. This basic configuration is shown in the example in FIG. 1 of a behind-the-ear hearing device. One or more microphones 2 for recording the ambient sound are incorporated in a hearing device housing 1 to be worn behind the ear. A signal processing unit 3, which is similarly integrated into the hearing device housing 1, processes the microphone signals and amplifies them. The output signal of the signal processing unit 3 is transmitted to a loudspeaker and/or receiver 4, which outputs an acoustic signal. The sound is optionally transmitted to the ear drum of the device wearer via a sound tube, which is fixed with an otoplastic in the auditory canal. The power supply of the hearing device and in particular of the signal processing unit 3 is provided by a battery 5 which is likewise integrated into the hearing device housing 1.

The power of a transmitter in a data transmission system must be configured such that a level which is sufficient for demodulating the signal reaches the receiver even in the case of a maximum admissible distance between the transmitter and receiver. In this way, the attenuation of the signal, the interference and external faults are taken into consideration. The attenuation is very heavily dependent on the distance between the transmitter and receiver, so that under some circumstances a significantly stronger signal level reaches the receiver with shorter transmission distances than would be necessary for transmission purposes. This can lead to overloading and non-linear distortions in the receiver and to unnecessary energy consumption in the transmitter. Excessively high distortions can render the transmission completely impossible in the case of very short distances. Furthermore, in extreme cases, a very high reception level can damage the receiver. This behavior is particularly pronounced in the case of inductive transmission systems, such as in hearing devices and hearing device accessories, because the dependency of the signal attenuation on the distance is greater here than in the case of electromagnetic systems (e.g. Bluetooth, cellular radio).

With hearing devices, the unnecessary energy consumption during transmission was previously often accepted. On the receiver side, an automatic gain control (AGC) is mostly implemented, which reduces overloading and distortions. Also known from the cellular radio field is increasing the transmission power with poor availability, which is equivalent to reducing the transmission power with good availability (see EBERSPÄCHER, J.; VÖGEL, H.-J.: GSM Global System for Mobile Communication. Stuttgart: Teubner, 1997, pages 100-111. ISBN 3-519-06192-9).

The publication DE 102005005603 A1 discloses a data transmission apparatus for wireless data transmission for hearing devices and a corresponding method. So that hearing devices can be reached over longer transmission paths, a converter unit with a high frequency receiving device for receiving high-frequency signals of an external transmitting unit is proposed. The converter unit also has a mixer unit for mixing the high-frequency signal with a reference signal, so that an output signal can be generated, the frequency of which is lower by at least one order of magnitude and which is suited to inductive transmission. The output signal is then transmitted inductively from the converter to the hearing device.

SUMMARY OF INVENTION

The object of the present invention consists in proposing a transmission method for the inductive transmission in hearing devices and hearing device accessories, as well as a corresponding hearing device system, in which artifacts due to overloading and distortions are reduced on the one hand and the most minimal power consumption possible can be ensured on the other hand during transmission.

In accordance with the invention, this object is achieved by a transmission method for the inductive transmission in hearing devices and hearing device accessories, by transmitting a signal from a transmitter to a receiver with a specific transmission power, by returning an item of quality information relating to the received signal from the receiver back to the transmitter and dynamically modifying the transmission power as a function of the item of quality information.

A corresponding hearing device system with a transmitter for the inductive transmission of a signal to a receiver with a specific transmission power is also provided in accordance with the invention, with the receiver being embodied to inductively return an item of quality information relating to the received signal back to the transmitter and the transmission power of the transmitter being dynamically modifiable as a function of the item of quality information.

It is advantageously possible to dynamically adjust the transmission power to the current conditions of a transmission channel. In this process, the actual attenuation of the transmitted signal is taken into consideration.

The item of quality information advantageously contains an item of information relating to the received signal strength. It is thus possible for a predetermined minimum level of the received signal to be aimed for at the receiver, which provides for high-quality further processing.

Alternatively or in addition, the item of quality information can contain an item of information relating to a bit error rate of the received signal. The quality of the transmission channel is thus actually measured by the reliability with which information can be transmitted.

It is particularly advantageous if the transmission power is modified to such an extent, i.e. reduced or increased, until the received signal has reached a predetermined minimum quality. In this way, the transmission power can be reduced to a minimum, which on the one hand still ensures acceptable transmission quality and on the other hand does not result in unnecessary power consumption.

The aforementioned object is also achieved by a transmission method for the inductive transmission in hearing devices and hearing device accessories by transmitting a signal from a transmitter to a receiver with a specific transmission power, by detection of an item of distance information through the transmitter relating to a distance of the receiver from the transmitter and dynamically modifying the transmission power as a function of the distance information.

Provision is also made here for a corresponding hearing device system with a transmitter for the inductive transmission of a signal to a receiver with a specific transmission power, with a sensor for detecting distance information relating to a distance of the transmitter from the receiver being connected to the transmitter and the transmission power of the transmitter being dynamically modifiable as a function of distance information.

The advantage of this dynamic transmission power adjustment of the wireless data transmission systems lies in the fact that no feedback from the receiver to the transmitter is necessary. Instead, a purely transmitter-side control of the transmission power takes place here.

The distance information can preferably be detected on the basis of a misalignment of a transmitting coil of the transmitter. The misalignment is an indirect item of information relating to a distance at which a receiver coil is located adjacent to the transmitting coil for instance. If the distance of both coils is very close, the resonant frequency of an oscillating circuit changes in the transmitter for instance.

The detection of distance information can however also be carried out on the basis of a radiated transmission power. A principle of the transponder technology is thus used, in which the presence of a transponder coil in a magnetic field can be detected on the basis of the radiated power.

BRIEF DESCRIPTION OF THE DRAWINGS

The present invention is described in more detail with referenced to the appended drawings, in which;

FIG. 2 shows a circuit diagram of a data transmission system according to the invention with dynamic transmission power adjustment according to a first embodiment and FIG. 3 shows a circuit diagram of a data transmission system with dynamic transmission power adjustment according to a second embodiment.

DETAILED DESCRIPTION OF INVENTION

Figure 1:
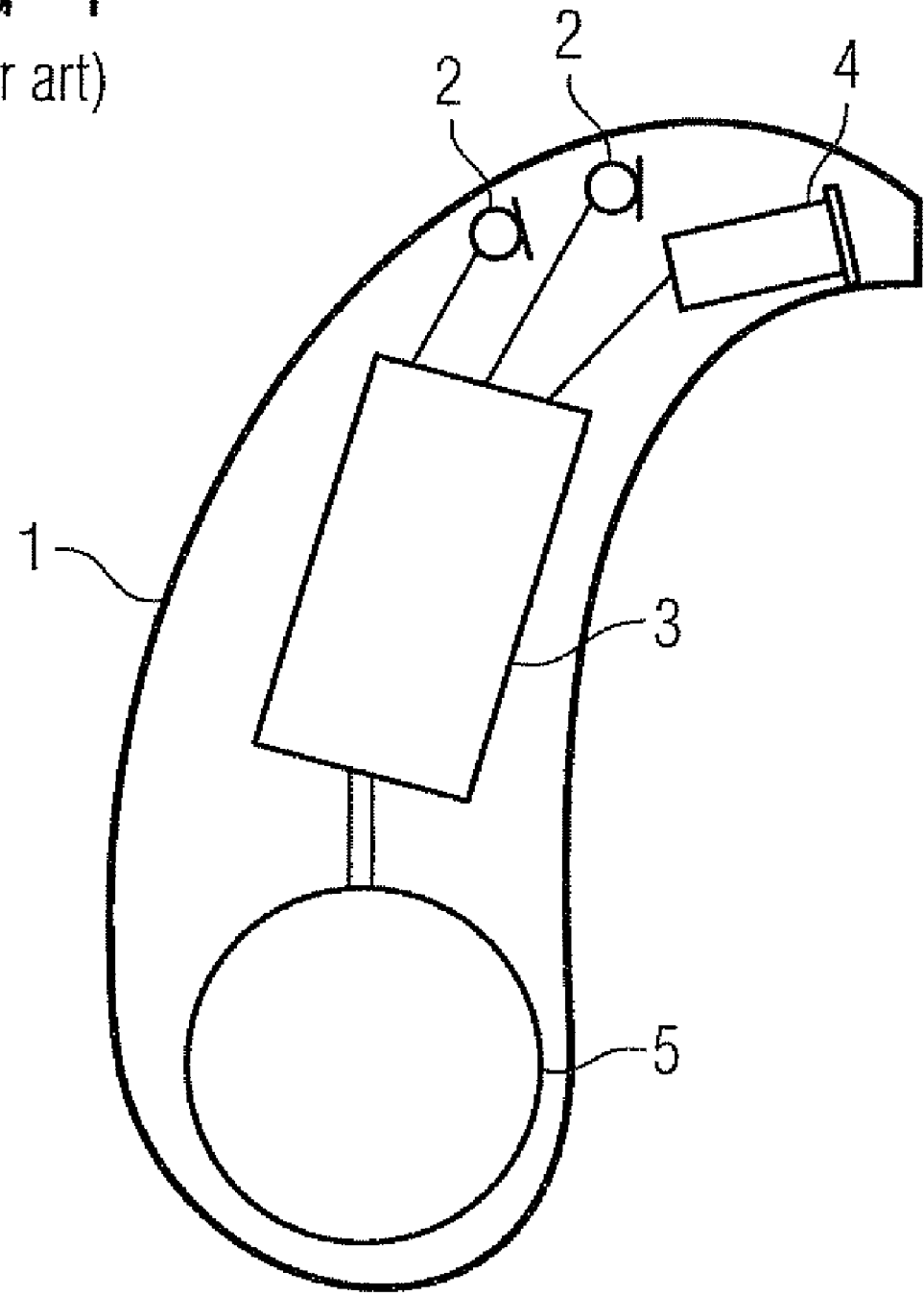
FIG. 1 shows a basic circuit diagram of a hearing device according to the prior art.

The exemplary embodiments illustrated in more detail below represent preferred embodiments of the present invention.

For overview purposes, the exemplary embodiment of an inventive hearing device system illustrated in FIG. 2 only shows the essential transmission system having a transmitting unit 10 and a receiving unit 20. Each of these units is either integrated in a hearing device or in a hearing device accessory, e.g. a remote controller or a microphone which is external to the hearing device.

Here the transmitting unit 10 includes a power amplifier 11, the output power of which can be controlled and/or regulated. The output signal of the power amplifier 11 is applied to a transmitting coil 13 by way of a switch 12. During transmission, the switch connects the output of the power amplifier 11 to the coil 13. The receiving unit 20 has a corresponding receiving coil 23, which is connected to an amplifier 21 with low noise by way of a switch 22. This amplifier 21 can be controlled and/or regulated. In the case of reception, the switch 22 connects the receiving coil 23 to the minimally noisy amplifier 21.

A measuring unit 24 is connected to the output of the minimally noisy amplifier 21, which measures the received signal strength or establishes a bit error rate. This bit error rate or signal strength is now to be transmitted to the transmitting unit 10 for dynamic transmission power adjustment purposes. To this end, the switch 22 of the receiving unit 20 is reversed at a suitable point in time such that it connects the output of the measuring unit 24 to the receiving coil 23. The receiving coil 23 is now used for transmission purposes. To be able to apply the corresponding transmission power, a suitable power amplifier is integrated into the measuring unit 24.

On the transmit side, the coil 13 is now used to receive signals and the switch 12 connects the coil 13 to the input of a controller 14. This receives the signal strength information from the receiver and controls the power amplifier 11 accordingly. Attempts are always made here to minimize the transmission power as far as possible, but to guarantee a required minimum signal strength on the receiver in this process. The adjustment of the transmission power can be carried out iteratively in a number of steps, with current signal strength data being transmitted back to the transmitter during intervals in transmission.

The dynamic transmission power adjustment according to the exemplary embodiment in FIG. 2 is based on a bidirectional connection. The receiver 20 is namely able to inform the transmitter 10 about the received signal strength or the bit error rate during signal reception or both. The transmitter 10 can then reduce the transmission power in the case of an excessively large signal strength or increase the transmission power in the case of an excessively large bit error rate.

FIG. 3 shows a further exemplary embodiment of a transmitting unit 30 and a receiving unit 40 of an inventive hearing device system. The transmitting unit 30 also has a controllable and/or regulatable power amplifier 31. Its output is permanently connected here to a transmitting coil 32.

The transmitting unit 40 has a corresponding transmitting coil 42, the receive signal of which is permanently fed into the input of a minimally noisy amplifier 41.

In order to adjust the transmission power, the transmitter 30 has a sensor 33, which detects a distance 34 from the transmitter 30 to the receiver 40. The distance 34 does not have to explicitly concern a distance specification. Instead, the distance 34 can also be an item of information which indirectly stands for the distance between the transmitter 30 and receiver 40. In particular, the distance 34 need also not represent the shortest distance between the transmitter 30 and the receiver 40. The distance 34 can thus also illustrate a detour for instance, which the signal takes during data transmission as a result of obstacles. By way of example the distance 34 does not represent the shortest distance between the hearing devices worn on the ears, in the case of a binaural hearing device supply, but instead the signal transmission path around the head, when the signals take this path.

The sensor 33 supplies the determined distance signal 34 to a control unit 35, which now controls the power amplifier 31 as a function of the distance 34.

The sensor 33 can also obtain an item of distance information, by establishing that the transmitting field through the receiver 40 has changed. The change can be used as a measure for the distance. This principle is also used with transponders. Alternatively, the transmission power can also be detected by the sensor 33, which likewise changes as a function of the distance of the receiver 40 from the transmitter 30. Furthermore, it is likewise possible in accordance with transponder technology to herewith establish the distance of the receiver 40, and to which extent the receiver 40 e.g. the oscillation amplitude of the transmitter 30 modulates due to its presence.

In each exemplary embodiment illustrated in conjunction with FIG. 3, only the distance between the transmitter 30 and receiver 40 is taken into consideration for the dynamic transmission power adjustment. This distance is determined by the transmitter 30 irrespective of the receiver 40 on the basis of sensor data. The method can thus also be applied to purely unidirectional transmitter-receiver systems.

It is common to all afore-described exemplary embodiments that the transmitter is able to dynamically adjust the transmission power to the distance and/or noise level, instead of permanently operating with maximum transmission power. Consequently, the energy consumption in the transmitter can be reduced by the reduced transmission power and in the receiver by avoiding overloads respectively. Reduced, non-linear distortions resulting herefrom enable the transmission even with very short distances. Furthermore, the reduced transmission power does not result in damages to the receiver.

The invention claimed is:

1. A transmission method for the inductive transmission in hearing devices and hearing device accessories, comprising
    transmitting a signal from a transmitter to a receiver with a specific transmission power;
    returning from the receiver to the transmitter an item of quality information that indicates the quality of the signal received by the receiver; and
    dynamically modifying the transmission power during transmission as a function of the quality of the signal received by the receiver;
    wherein the transmission power is reduced until the received signal has reached a predetermined minimal quality.

2. The transmission method as claimed in claim 1, wherein the item of quality information includes an item of information relating to the received signal strength.

3. The transmission method as claimed in claim 1, wherein the item of quality information includes an item of information relating to the bit error rate of the received signal.

4. A hearing device system, comprising:
    a transmitter that inductively transmits a signal to a receiver with a specific transmission power,
    wherein the receiver inductively returns to the transmitter an item of information that indicates the quality of the signal received by the receiver, and
    wherein the transmission power of the transmitter is dynamically modified during transmission as a function of the quality of the signal received by the receiver;
    wherein the transmission power is reduced until the received signal has reached a predetermined minimal quality.

5. The hearing device system as claimed in claim 4, wherein the item of quality information includes an item of information relating to the received signal strength.

6. The hearing device system as claimed in claim 4, wherein the item of quality information includes an item of information relating to the bit error rate of the received signal.

7. A transmission method for the inductive transmission in hearing devices and hearing device accessories, comprising:
    transmitting a signal from a transmitter to a receiver with a specific transmission power,
    detecting an item of distance information through the transmitter relating to a distance of the receiver from the transmitter; and
    dynamically modifying the transmission power during transmission as a function of the distance information,
    wherein the detection of the distance information being carried out on the basis of a misalignment of a transmitting coil of the transmitter, and
    wherein the detection of the distance information being carried out on the basis of a radiated transmission power.

8. A hearing device system, comprising
    a transmitter that inductively transmits a signal to a receiver with a specific transmission power; and
    a sensor for detecting distance information relating to a distance of the receiver from the transmitter is connected to the transmitter;
    wherein the transmission power of the transmitter being able to be dynamically modified during transmission as a function of the distance information,
    wherein the detection of the distance information being carried out on the basis of a misalignment of a transmitting coil of the transmitter, and
    wherein the detection of the distance information being carried out on the basis of a radiated transmission power.

* * * * *